US012738412B2

(12) United States Patent
Otsubo

(10) Patent No.: US 12,738,412 B2
(45) Date of Patent: Sep. 15, 2026

(54) INDUCTOR

(71) Applicant: Panasonic Intellectual Property Management Co., Ltd., Osaka (JP)

(72) Inventor: Mutsuyasu Otsubo, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 743 days.

(21) Appl. No.: 18/250,905

(22) PCT Filed: Nov. 17, 2021

(86) PCT No.: PCT/JP2021/042198
§ 371 (c)(1),
(2) Date: Apr. 27, 2023

(87) PCT Pub. No.: WO2022/113840
PCT Pub. Date: Jun. 2, 2022

(65) Prior Publication Data

US 2023/0395308 A1 Dec. 7, 2023

(30) Foreign Application Priority Data

Nov. 27, 2020 (JP) ................................ 2020-196882

(51) Int. Cl.
*H01F 27/24* (2006.01)
*H01F 27/29* (2006.01)
*H01F 41/10* (2006.01)

(52) U.S. Cl.
CPC ........... *H01F 27/292* (2013.01); *H01F 27/24* (2013.01); *H01F 41/10* (2013.01)

(58) Field of Classification Search
CPC ........ H01F 27/292; H01F 27/24; H01F 41/10; H01F 2017/048; H01F 17/04
(Continued)

(56) References Cited

U.S. PATENT DOCUMENTS

| | | | | |
|---|---|---|---|---|
| 9,537,254 B2 * | 1/2017 | Yano | .................. | H01R 13/6205 |
| 2007/0188286 A1 * | 8/2007 | Yoshimoto | ............ | H01F 17/045 336/192 |

(Continued)

FOREIGN PATENT DOCUMENTS

| | | | | |
|---|---|---|---|---|
| CN | 110875126 A | * 3/2020 | ........... | H01F 27/292 |
| JP | 2011-243685 A | 12/2011 | | |
| JP | 2016-127189 A | 7/2016 | | |

OTHER PUBLICATIONS

International Search Report issued on Feb. 22, 2022 in International Patent Application No. PCT/JP2021/042198, with English translation.

*Primary Examiner* — Pinping Sun
(74) *Attorney, Agent, or Firm* — Rimon P.C.

(57) ABSTRACT

An inductor includes: a magnetic core including a bottom surface, a top surface, and a side surface; a coil element including a coil portion buried in the magnetic core; an electrode member located outside of the magnetic core and electrically connected to the coil element; a first adhesive adhering the magnetic core and the electrode member; and a second adhesive adhering the magnetic core and the electrode member at a position different from the first adhesive. The electrode member includes a first bottom plate portion overlapping the bottom surface, and a second bottom plate portion connected to the first bottom plate portion and projecting from the side surface. The first adhesive is located between the first bottom plate portion and the bottom surface. The second adhesive is located at a corner between an edge of the side surface on the bottom surface side and the second bottom plate portion.

11 Claims, 15 Drawing Sheets

(58) Field of Classification Search
USPC .................... 336/83, 90, 192, 208, 221, 232
See application file for complete search history.

(56) References Cited

U.S. PATENT DOCUMENTS

| | | | | |
|---|---|---|---|---|
| 2011/0279211 | A1 | 11/2011 | Miura et al. | |
| 2013/0027161 | A1* | 1/2013 | Urano | H01F 17/04 336/83 |
| 2017/0221623 | A1* | 8/2017 | Kawarai | H01F 27/2823 |
| 2018/0308623 | A1* | 10/2018 | Tanaka | H01F 17/045 |
| 2019/0080835 | A1* | 3/2019 | Shibuya | H01F 27/2823 |

* cited by examiner

INDUCTOR

CROSS-REFERENCE OF RELATED APPLICATIONS

This application is the U.S. National Phase under 35 U.S.C. § 371 of International Patent Application No. PCT/JP2021/042198, filed on Nov. 17, 2021, which in turn claims the benefit of Japanese Patent Application No. 2020-196882, filed on Nov. 27, 2020, the entire disclosures of which applications are incorporated by reference herein.

TECHNICAL FIELD

The present disclosure relates to inductors.

BACKGROUND ART

Inductors, which are passive elements that store electrical energy as magnetic energy, are used in, for example, DC-DC converter devices for the purpose of stepping up/down power supply voltage and smoothing direct current. An inductor is mounted, for example, on the surface of a circuit board or the like. For example, Patent Literature (PTL) 1 discloses an inductor including a body portion containing a magnetic material, a coil located inside the body portion, a terminal fitting connected to the coil, and the like. In the inductor described in PTL 1, the bottom surface of the body portion and the terminal fitting are fixed using an adhesive.

CITATION LIST

Patent Literature

[PTL 1]
Japanese Unexamined Patent Application Publication No. 2011-243685

SUMMARY OF INVENTION

Technical Problem

The conventional inductor may have low reliability due to low reliability of connection between the electrode member such as the terminal fitting and the body portion, the circuit board, or the like. In view of this, the present disclosure has an object of providing a highly reliable inductor.

Solution to Problem

An inductor according to an aspect of the present disclosure includes: a magnetic core containing a magnetic material and including a bottom surface, a top surface, and a side surface connected to the bottom surface and the top surface; a coil element including a coil portion buried in the magnetic core, and formed by a conductive wire; an electrode member containing a conductive material, located outside of the magnetic core, and electrically connected to the coil element; a first adhesive containing an adhesive resin material and adhering the magnetic core and the electrode member to each other; and a second adhesive containing an adhesive resin material and adhering the magnetic core and the electrode member to each other at a position different from the first adhesive, wherein the electrode member includes: a first bottom plate portion located on a same side as the bottom surface of the magnetic core to extend along the bottom surface, and overlapping the bottom surface in a plan view of the bottom surface; and a second bottom plate portion connected to the first bottom plate portion, and projecting from the side surface in the plan view of the bottom surface, the first adhesive is located between the first bottom plate portion and the bottom surface, and the second adhesive is located at a corner between an edge of the side surface closer to the bottom surface and the second bottom plate portion.

Advantageous Effects of Invention

According to the present disclosure, a highly reliable inductor can be provided.

Figure 1:
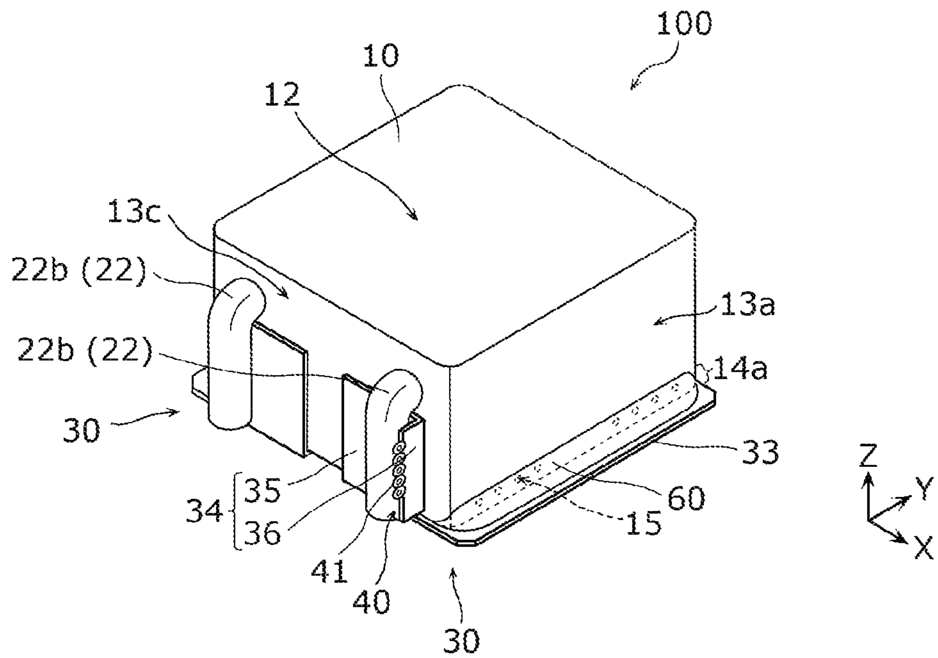
FIG. 1 is a perspective view of an inductor according to an embodiment.

DESCRIPTION OF EMBODIMENTS (Circumstances Leading to the Present Disclosure)

As mentioned above, in the inductor described in PTL 1, the bottom surface of the body portion which is the magnetic core and the terminal fitting which is the electrode member are fixed using an adhesive. The inductor is used, for example, in a state of being surface-mounted on a circuit board or the like.

In recent years, for example in the case of increasing the load capacity of a power supply device such as a DC-DC converter device, the diameter of the conductive wire forming the coil portion of the inductor may be increased. In such a case, the size of the magnetic core is increased, too. In the case where the size of the inductor is increased, simply fixing the electrode member to the bottom surface of the magnetic core using an adhesive as in PTL 1 does not provide sufficient connection strength, and a decrease in the reliability of connection between the electrode member and the magnetic core, such as a decrease in vibration resistance, is likely to ensue. In the case where the size of the inductor is increased, the heat capacity of the inductor (especially the magnetic core) increases. Accordingly, when connecting the electrode member of the inductor to the circuit board or the like by reflow soldering or the like, the solder does not melt easily by the heat of the reflow furnace, and the reliability of connection between the inductor and the circuit board or the like is likely to decrease. Thus, particularly in the case where the size of the inductor is increased due to, for example, the use of a thick conductive wire in the coil portion, the connection reliability of the inductor tends to decrease. Consequently, for example, the electrode member and the magnetic core or the circuit board are likely to separate from each other due to vibration, and the reliability of the inductor, such as the vibration resistance of the inductor, decreases.

The present disclosure has the following structure in order to implement a highly reliable inductor. Embodiments will be described in detail below with reference to the drawings.

The embodiments described below each show a specific example according to the present disclosure. The numerical values, shapes, materials, structural elements, the arrangement and connection of the structural elements, steps, the order of steps, etc. shown in the following embodiments are mere examples, and do not limit the scope of the present disclosure. Of the structural elements in the embodiments described below, the structural elements not recited in any one of the independent claims are described as optional structural elements.

In this specification, the terms indicating the relationships between elements, such as “parallel”, the terms indicating the shapes of elements, such as “rectangular parallelepiped”, and the numerical ranges are not expressions of strict meanings only, but are expressions of meanings including substantially equivalent ranges, for example, allowing for a difference of about several percent.

Each drawing is a schematic involving emphasis, omission, or proportion adjustment as appropriate to show the present disclosure and does not necessarily provide precise depiction, and accordingly may differ from the actual shapes, positional relationships, and proportions. The substantially same elements are given the same reference signs throughout the drawings, and repeated description may be omitted or simplified.

The X-axis, the Y-axis, and the Z-axis representing three directions orthogonal to one another are given in each drawing, and these axes and the axial directions along the axes are used for explanation as necessary. The axes are given for explanation, and do not limit the direction and position in which the inductor is used.

In this specification, the terms “top surface” and “bottom surface” in the structure of the inductor do not refer to the top surface (vertically upper surface) and the bottom surface (vertically lower surface) in absolute spatial recognition, but are used as terms defined by the relative positional relationship of the structural elements of the inductor.

Embodiment

[Structure]

The structure of an inductor according to an embodiment will be described below. The inductor is a passive element that stores electrical energy flowing through a coil element as magnetic energy.

Figure 2:
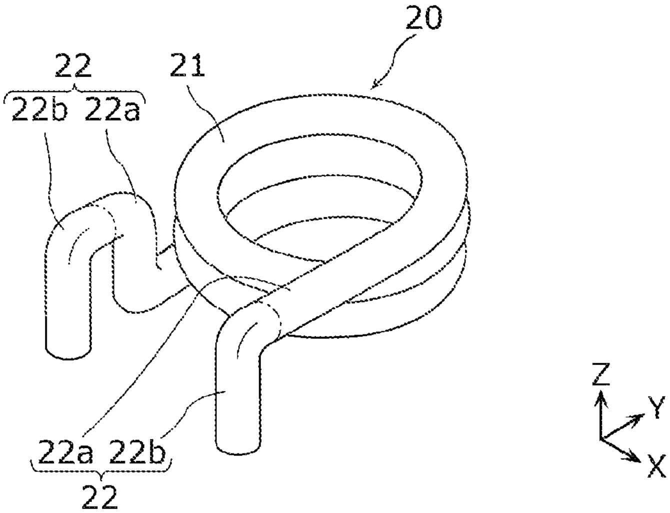
FIG. 2 is a perspective view of a coil element included in the inductor according to the embodiment.
Figure 3:
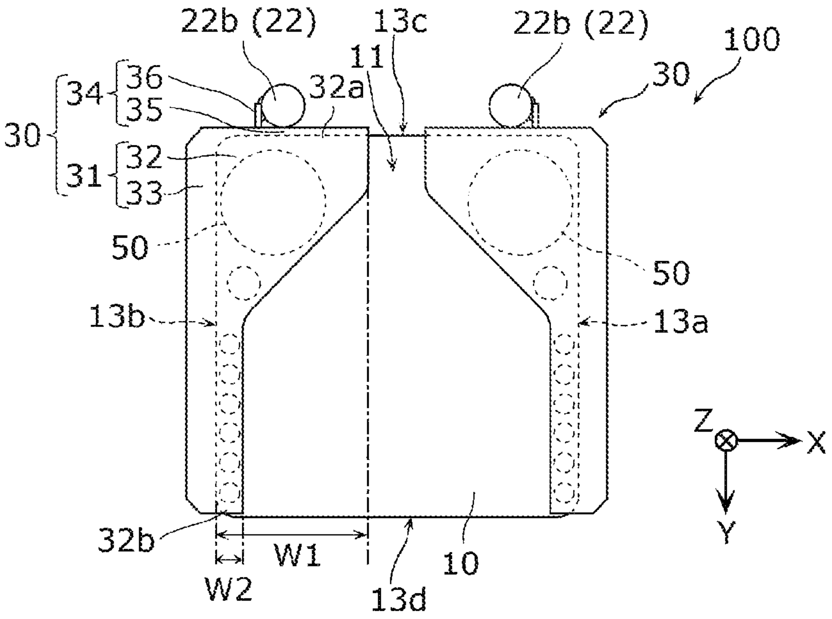
FIG. 3 is a bottom view of the inductor according to the embodiment.
Figure 4:
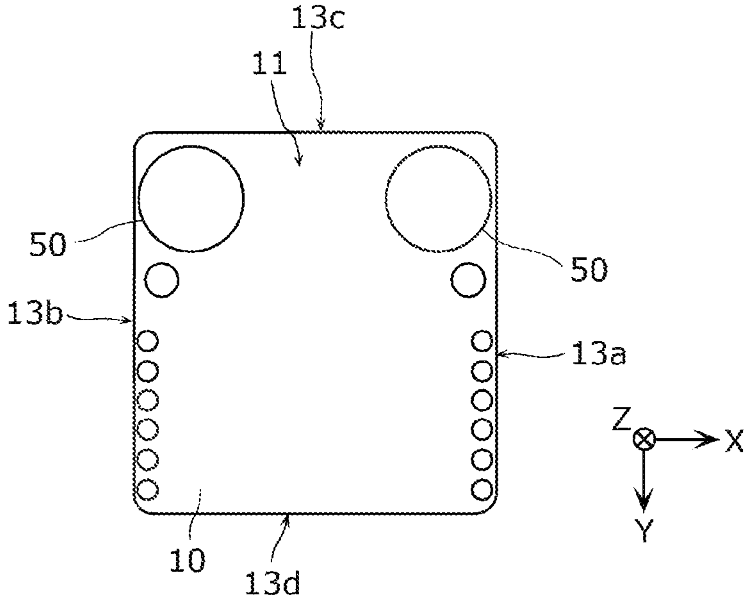
FIG. 4 is a bottom view illustrating a state in which the coil element, an electrode member, a connection portion, and a second adhesive are removed from the inductor illustrated in FIG. 3.
Figure 5:
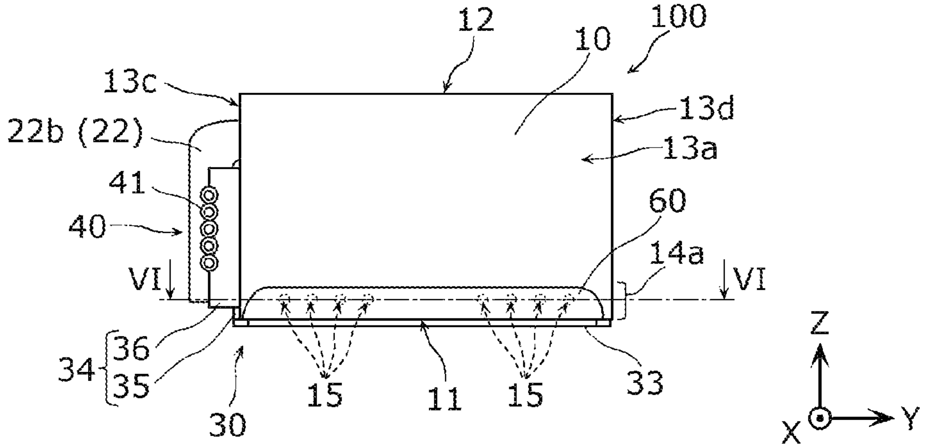
FIG. 5 is a side view of the inductor according to the embodiment.
Figure 6:
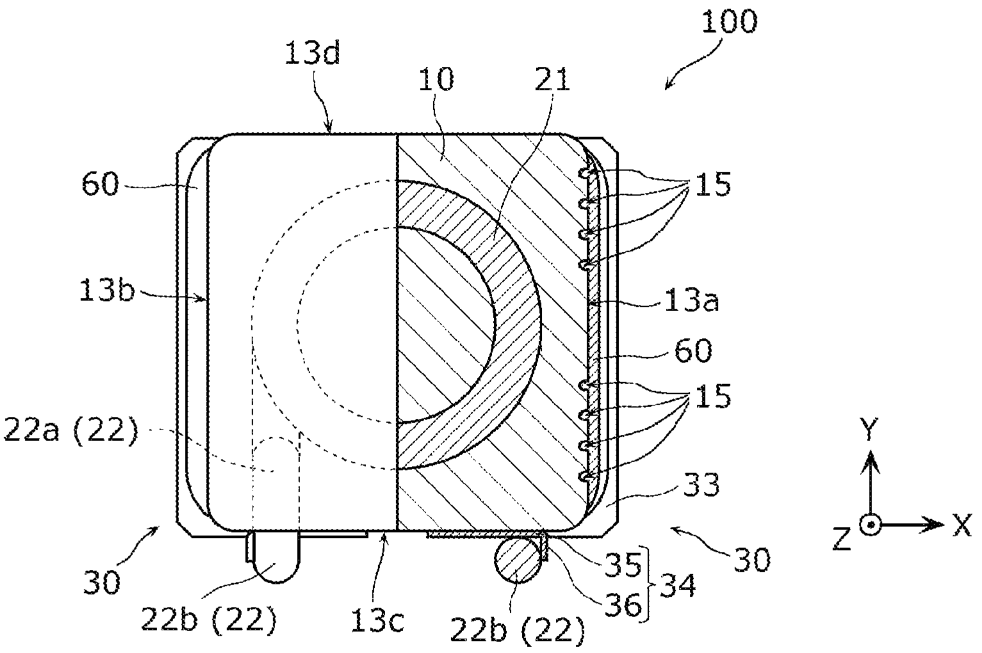
FIG. 6 is a top view of the inductor according to the embodiment.

FIG. 1 is a perspective view of inductor 100 according to an embodiment. FIG. 2 is a perspective view of coil element 20 included in inductor 100 according to the embodiment. FIG. 3 is a bottom view of inductor 100 according to the embodiment. FIG. 4 is a bottom view illustrating a state in which coil element 20, electrode member 30, connection portion 40, and second adhesive 60 are removed from inductor 100 illustrated in FIG. 3. FIG. 5 is a side view of inductor 100 according to the embodiment. FIG. 6 is a top view of inductor 100 according to the embodiment.

In FIGS. 3 to 6, the bottom view is a view from the negative side to the positive side of the Z-axis, the side view is a view from the positive side to the negative side of the X-axis, and the top view is a view from the positive side to the negative side of the Z-axis. The bottom view and the top view are each also a plan view of bottom surface 11. The same applies to the other drawings. In FIGS. 1 and 5, the shape seen through second adhesive 60 is indicated by dashed lines. In FIG. 3, the shapes of bottom surface 11 of magnetic core and first adhesive 50 in a plan view at positions overlapping electrode member 30 are indicated by dashed lines. FIG. 6 also includes a sectional view of inductor 100 taken along line VI-VI in FIG. 5. In FIG. 6, the shape of coil element 20 seen through magnetic core 10 in a top view is indicated by dashed lines.

As illustrated in FIGS. 1 to 6, inductor 100 includes magnetic core 10 having a plurality of holes 15, coil element 20 including coil portion 21 buried in magnetic core 10, electrode member 30 electrically connected to coil element 20, connection portion 40 connecting coil element 20 and electrode member 30, and first adhesive 50 and second adhesive 60 adhering magnetic core 10 and electrode member 30 to each other. For example, first adhesive 50 is very thin, and accordingly the thickness of first adhesive 50 is ignored in each drawing.

The following description mainly focuses on half of inductor 100 on the positive side of the X-axis. Half of inductor 100 on the negative side of the X-axis has the same structure as half of inductor 100 on the positive side of the X-axis, and the same description applies.

As illustrated in FIG. 1, inductor 100 has an outer shape roughly determined by the shape of magnetic core 10 which is a rectangular parallelepiped dust core, for example. Magnetic core 10 can be molded into any shape. In other words, any shape of inductor 100 can be obtained according to the shape of magnetic core 10 in molding. Magnetic core 10 in this embodiment has the dimensions of 15 mm or more in the X-axis direction, 15 mm or more in the Y-axis direction, and 9 mm or more in the Z-axis direction.

Magnetic core 10 is the outer shell of inductor 100, and covers part of coil element 20. Magnetic core 10 contains a magnetic material, and is, for example, a dust core made of a metal magnetic powder and a resin material or the like. Magnetic core 10 is not limited as long as it is formed using a magnetic material. As the magnetic material, ferrite or any other magnetic material may be used. As the metal magnetic powder, a particulate material having a predetermined elemental composition, such as Fe—Si—Al-based, Fe—Si-based, Fe—Si—Cr-based, or Fe—Si—Cr—B-based, is used. As the resin material, a material that can maintain a certain shape by binding the particles of the metal magnetic powder while insulating the particles of the metal magnetic powder from each other, such as a silicone-based resin, is selected.

As illustrated in FIGS. 1, 3, and 6, magnetic core 10 is, for example, a rectangular parallelepiped. Magnetic core 10 includes bottom surface 11, top surface 12 opposite to bottom surface 11, and four side surfaces 13*a*, 13*b*, 13*c*, and 13*d* connected to bottom surface 11 and top surface 12. Side surfaces 13*a* and 13*b* are arranged in the X-axis direction and are opposite to each other. Side surfaces 13*c* and 13*d* are arranged in the Y-axis direction and are opposite to each other. Bottom surface 11, top surface 12, and side surfaces 13*a*, 13*b*, 13*c*, and 13*d* are each a flat surface. The pair of bottom surface 11 and top surface 12, the pair of side surfaces 13*a* and 13*b*, and the pair of side surfaces 13*c* and 13*d* are each a pair of surfaces parallel to each other. Bottom surface 11 and top surface 12 extend in a direction crossing side surfaces 13*a*, 13*b*, 13*c*, and 13*d*, specifically, in a direction orthogonal to side surfaces 13*a*, 13*b*, 13*c*, and 13*d*. Side surfaces 13*a* and 13*b* extend in a direction crossing side surfaces 13*c* and 13*d*, specifically, in a direction orthogonal to side surfaces 13*c* and 13*d*.

As illustrated in FIGS. 1, 5, and 6, magnetic core 10 has a plurality of holes 15 that are open on edge 14*a* of side surface 13*a* on the bottom surface 11 side. In this specification, edge 14*a* is, for example, a region in side surface 13*a* whose height from bottom surface 11 is 30% or less of the height of side surface 13*a* from bottom surface 11. Edge 14*a* may be a region in side surface 13*a* whose height from bottom surface 11 is 15% or less of the height of side surface 13*a* from bottom surface 11. Although not illustrated, a plurality of holes 15 are also formed at the edge of side surface 13*b* on the bottom surface 11 side. The plurality of holes 15 formed at the edge of side surface 13*b* have, for example, the same structure as the plurality of holes 15 formed at edge 14*a* of side surface 13*a*, and the same description applies.

Each hole 15 is a bottomed hole having a bottom. Hole 15 is a bottomed hole recessed in a direction intersecting side surface 13*a*. In this embodiment, hole 15 is a bottomed hole recessed in a direction (X-axis direction) perpendicular to side surface 13*a*. The number of holes 15 is not limited, and is designed according to the purpose. For example, the plurality of holes 15 are arranged in a line in a direction (Y-axis direction) along the edge line between side surface 13*a* and bottom surface 11. In this embodiment, the plurality of holes 15 have the same shape. The opening shape of hole 15 is, for example, circular. The opening shape may be any other shape such as elliptical or polygonal with rounded corners. The size of the opening shape of hole 15 is not limited. In the case where the opening shape is circular, the diameter of the circle is, for example, 0.05 mm or more and 1 mm or less.

As illustrated in FIGS. 1 and 2, coil element 20 includes coil portion 21 and a plurality of drawn portions 22 that are connected to the respective ends of coil portion 21, extend from coil portion 21 to the outside of magnetic core 10, and are partially exposed on the outside of magnetic core 10. Coil element 20 in this embodiment includes one coil portion 21 and two drawn portions 22. Coil element is, for example, composed of a conductive wire. The conductive wire is composed of: a metal wire made of a metal material selected from metals such as aluminum, copper, silver, and gold, alloys containing one or more of these metals, materials consisting of metals or alloys and other substances, etc.; and an insulating coating covering the metal wire. Specifically, the conductive wire is a copper wire coated with an insulating coating, for example. For example, coil portion 21 and drawn portion 22 are names given to respective parts formed by working one member made of the same material. Coil element 20 may be formed by connecting coil portion 21 and drawn portion 22 that are separate members.

Coil portion 21 is a part covered with magnetic core 10. Coil portion 21 is composed of a wound conductive wire, and functions as a coil. The number of turns of coil portion 21 is not limited, and is selected as appropriate according to the performance required of inductor 100 and the constraints such as the size of magnetic core 10, for example, from 0.5 turns to 10 turns. For example, the cross section of the conductive wire forming coil portion 21 is a circle with a diameter of 2 mm or more, and the aspect ratio of the cross section is 1:1. Coil portion 21 is buried in magnetic core 10 so that the winding axis of coil portion 21 will extend in the direction (Z-axis direction) connecting bottom surface 11 and top surface 12.

Each drawn portion 22 is connected to the corresponding end of wound coil portion 21 and extends from the end of coil portion 21 to the outside of magnetic core 10. Drawn portion 22 includes buried portion 22*a* buried in magnetic core 10 and exposed portion 22*b* that is not covered with magnetic core 10 but is drawn out from side surface 13*c* of magnetic core 10 and exposed. In FIG. 2, the part of drawn portion 22 on the positive side of the Y-axis from the dashed-dotted line made on drawn portion 22 is buried portion 22*a* buried in magnetic core 10, and the part of drawn portion 22 on the negative side of the Y-axis from the dashed-dotted line is exposed portion 22*b* exposed from magnetic core 10.

Buried portion 22*a* of one drawn portion 22 out of two drawn portions 22 is bent inside magnetic core 10. Two drawn portions 22 have the same height from bottom surface 11, and are drawn to the outside of magnetic core 10 from part of side surface 13*c* closer to top surface 12 to form exposed portion 22*b*. Exposed portion 22*b* is bent on the outside of magnetic core 10, and extends along side surface 13*c* in the direction (Z-axis direction) connecting bottom surface 11 and top surface 12. Exposed portion 22*b* extends to a point before reaching the end of side surface 13*c* on the bottom surface 11 side. Drawn portion 22 is electrically connected to electrode member 30 on the outside of magnetic core 10. That is, exposed portion 22*b* and electrode member 30 are electrically connected to each other. The position at which drawn portion 22 is drawn out from magnetic core 10 and the direction in which exposed portion 22*b* extends are not limited as long as drawn portion 22 is electrically connected to electrode member 30. At least part of exposed portion 22*b* may be flattened to facilitate connection with electrode member 30.

As illustrated in FIGS. 1 and 3, electrode member 30 is located on the outside of magnetic core 10, and is electrically connected to drawn portion 22 of coil element 20 via connection portion 40. Two electrode members 30 are provided for respective two drawn portions 22. The following description focuses on electrode member 30 on the positive side of the X-axis out of two electrode members 30. Electrode member 30 on the negative side of the X-axis has, for example, the same structure as electrode member 30 on the positive side of the X-axis, and the same description applies. Electrode member 30 includes bottom plate portion 31 located on the bottom surface 11 side of magnetic core 10 so as to extend along bottom surface 11, and connection plate portion 34 connected to bottom plate portion 31.

Electrode member 30 contains a conductive material, and is composed of, for example, a metal material plate. The metal material plate is made of a metal material selected from metals such as aluminum, copper, silver, and gold, alloys containing one or more of these metals, materials consisting of metals or alloys and other substances, etc. For example, bottom plate portion 31 and connection plate portion 34 are names given to respective parts formed by working one member made of the same material. Electrode member 30 may be formed by connecting bottom plate portion 31 and connection plate portion 34 that are separate members.

Bottom plate portion 31 is a flat plate portion. For example, bottom plate portion 31 is soldered to a circuit board or the like, and current from the circuit board flows through bottom plate portion 31 to coil element 20. Bottom plate portion 31 is located on the bottom surface 11 side of magnetic core 10 so as to extend along bottom surface 11. The direction in which bottom plate portion 31 extends and the direction in which each of side surfaces 13*a*, 13*b*, 13*c*, and 13*d* extends intersect each other, specifically, are orthogonal to each other. Bottom plate portion 31 includes first bottom plate portion 32 and second bottom plate portion 33. For example, first bottom plate portion 32 and second bottom plate portion 33 are names given to respective different regions of bottom plate portion 31 which is one flat plate.

First bottom plate portion 32 is located on the bottom surface 11 side of magnetic core 10 so as to extend along bottom surface 11. First bottom plate portion 32 overlaps bottom surface 11 in a plan view of bottom surface 11. First bottom plate portion 32 is a region of bottom plate portion 31 that overlaps bottom surface 11 in a plan view of bottom surface 11.

First bottom plate portion 32 is connected to connection plate portion 34 at first end 32*a* which is the end of first bottom plate portion 32 on the side surface 13*c* side of magnetic core 10 (i.e. on the negative side of the Y-axis). Width W2 of second end 32*b* which is the end of first bottom plate portion 32 opposite to first end 32*a*, i.e. the end of first bottom plate portion 32 on the side surface 13*d* side of magnetic core 10 (i.e. on the positive side of the Y-axis), is less than width W1 of first end 32*a*. Herein, the term “width” denotes, for example, the length in the direction (X-axis direction) orthogonal to the direction connecting side surfaces 13*c* and 13*d*. The size relationship between width W1 of first end 32*a* and width W2 of second end 32*b* is not limited to the foregoing example. Width W1 and width W2 may be the same, or width W2 may be greater than width W1.

Second bottom plate portion 33 is connected to first bottom plate portion 32, extends in the X-axis direction, and is located side by side with first bottom plate portion 32 in the X-axis direction. Second bottom plate portion 33 does not extend along side surface 13*a*, and is separated from side surface 13*a*. Second bottom plate portion 33 projects from side surface 13*a* in a plan view of bottom surface 11. That is, second bottom plate portion 33 extends from side surface 13*a* in a direction outward from magnetic core 10, i.e. a direction away from side surface 13*a*, in a plan view of bottom surface 11. Second bottom plate portion 33 is a region of bottom plate portion 31 that projects in a direction outward from magnetic core 10 from a position corresponding to side surface 13*a* in a plan view of bottom surface 11. As a result of electrode member 30 including second bottom plate portion 33 that projects outward from side surface 13*a*, the heat of the reflow furnace or the like during soldering such as reflow soldering can be easily absorbed by second bottom plate portion 33.

Connection plate portion 34 is connected to first end 32*a* of first bottom plate portion 32, and extends in the direction (Z-axis direction) connecting bottom surface 11 and top surface 12. Connection plate portion 34 is electrically connected to exposed portion 22*b* via connection portion 40. Connection plate portion 34 includes first side plate portion 35 and second side plate portion 36.

First side plate portion 35 is connected to first end 32*a* of first bottom plate portion 32, and is located along side surface 13*c*. First side plate portion 35 is located between exposed portion 22*b* and magnetic core 10. Second side plate portion 36 is connected to an end of first side plate portion 35, and is raised in a direction away from magnetic core 10. The end of second side plate portion 36 is connected to exposed portion 22*b* via connection portion 40.

The shape of connection plate portion 34 is not limited as long as it can be connected to drawn portion 22 via connection portion 40.

As illustrated in FIG. 1, connection portion 40 electrically connects drawn portion 22 of coil element 20 and connection plate portion 34 of electrode member 30. For example, connection portion 40 is composed of a plurality of welds 41 formed by welding the end of second side plate portion 36 to exposed portion 22*b* of drawn portion 22 by laser seam welding or the like. For example, the plurality of welds 41 are continuous and are connected to each other. Connection portion 40 may be made of solder, metal, conductive resin, or the like.

As illustrated in FIG. 4, first adhesive 50 is located on bottom surface 11 of magnetic core 10 in contact with bottom surface 11. As illustrated in FIG. 3, first bottom plate portion 32 of electrode member 30 is located on bottom surface 11 on which first adhesive 50 illustrated in FIG. 4 is located so as to sandwich first adhesive 50. That is, first adhesive 50 is located between first bottom plate portion 32 and bottom surface 11 of magnetic core 10, and is in contact with and adheres to first bottom plate portion 32 and bottom surface 11. First adhesive 50 thus adheres magnetic core 10 and electrode member 30 to each other. First adhesive 50 is, for example, in the shape of a thin film. In this embodiment, a plurality of thin-film first adhesives 50 that are each circular in a plan view are located between first bottom plate portion 32 and bottom surface 11 in contact with first bottom plate portion 32 and bottom surface 11. The shape of first adhesive 50 in a plan view is not limited. For example, first adhesive 50 may spread over the entire region where bottom surface 11 and first bottom plate portion 32 overlap in a plan view of bottom surface 11.

First adhesive 50 contains an adhesive resin material. As first adhesive 50, a known adhesive containing a silicone-based resin, an epoxy-based resin, an acrylic-based resin, or the like may be used. Examples include thermosetting adhesives, photocurable adhesives, and two-part curable adhesives.

As illustrated in FIGS. 1, 5, and 6, second adhesive 60 is located at the corner between edge 14*a* of side surface 13*a* on the bottom surface 11 side and second bottom plate portion 33, and is in contact with and adheres to edge 14*a* of side surface 13*a* and second bottom plate portion 33. Second adhesive 60 thus adheres magnetic core 10 and electrode member 30 to each other at a position different from first adhesive 50. Second adhesive 60 fills the corner space formed between side surface 13*a* and second bottom plate portion 33. Hence, second adhesive 60 adheres magnetic core 10 and electrode member 30 to each other on side surface 13*a* of magnetic core 10 which is different from bottom surface 11 of magnetic core 10 to which first adhesive 50 adheres. This keeps electrode member 30 and magnetic core 10 from separating from each other due to vibration and the like.

Second adhesive 60 is elongated in the direction (Y-axis direction) of the edge line between side surface 13*a* and bottom surface 11. The length of the adhesion surface of second adhesive with side surface 13*a* in the direction (Z-axis direction) orthogonal to the edge line between side surface 13*a* and bottom surface 11 is, for example, equal to the length of the adhesion surface of second adhesive 60 with second bottom plate portion 33 in the direction (X-axis direction) orthogonal to the edge line between side surface 13*a* and bottom surface 11. Second adhesive 60 is, for example, in the shape of a fillet. A gap may be formed in a part between second adhesive 60 and side surface 13*a* or between second adhesive 60 and second bottom plate portion 33. Second adhesive 60 may be divided into a plurality of parts that are arranged at the corner between edge 14*a* of side surface 13*a* on the bottom surface 11 side and second bottom plate portion 33.

Second adhesive 60 enters each of the plurality of holes 15. That is, second adhesive 60 fills the plurality of holes 15. Second adhesive 60 is in contact with the surface of magnetic core 10 forming the plurality of holes 15. Second adhesive 60 need not completely fill the plurality of holes 15. For example, second adhesive 60 fills 10% or more of the volume of each of the plurality of holes 15. Second adhesive 60 may fill 50% or more of the volume of each of the plurality of holes 15.

Second adhesive 60 contains an adhesive resin material. As second adhesive 60, a known adhesive containing a silicone-based resin, an epoxy-based resin, an acrylic-based resin, or the like may be used. Examples include thermosetting adhesives, photocurable adhesives, and two-part curable adhesives. For example, the viscosity of second adhesive 60 before curing is higher than the viscosity of first adhesive 50 before curing. Hence, second adhesive 60 before curing is kept from flowing when applied between side surface 13*a* and second bottom plate portion 33, so that inductor 100 can be manufactured easily. Second adhesive 60 may be made of the same material as first adhesive 50. Since there is no need to use different adhesives for first adhesive 50 and second adhesive 60, inductor 100 can be manufactured easily.

Figure 7:
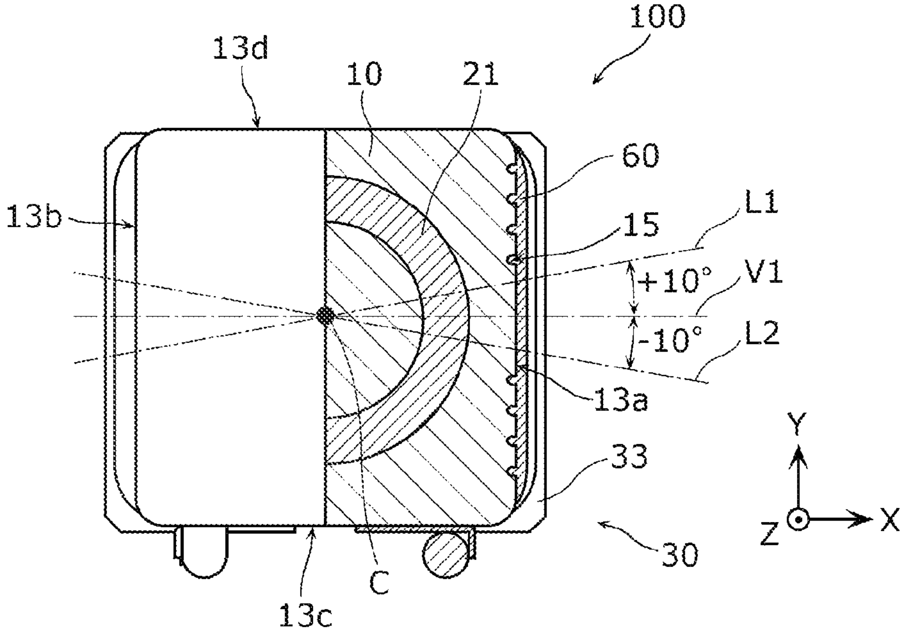
FIG. 7 is a diagram for explaining the arrangement of a plurality of holes in a magnetic core according to the embodiment.
Figure 8:
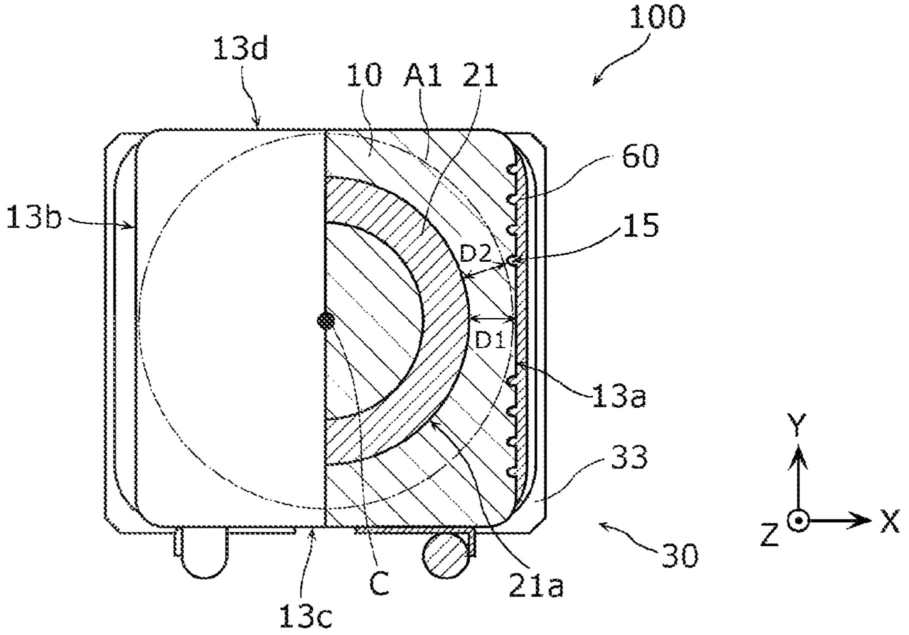
FIG. 8 is another diagram for explaining the arrangement of the plurality of holes in the magnetic core according to the embodiment.

The arrangement of the plurality of holes 15 will be described below. FIGS. 7 and 8 are diagrams for explaining the arrangement of the plurality of holes 15 in magnetic core 10. FIGS. 7 and 8 are each a top view of inductor 100, as with FIG. 6.

As illustrated in FIG. 7, all of the plurality of holes 15 are located outside the region bounded by virtual lines L1 and L2 in a plan view of bottom surface 11. Two virtual lines L1 and L2 are straight lines that form angles of +10° and −10° with respect to perpendicular line V1 to side surface 13*a* passing through winding axis C of coil portion 21 and that pass through winding axis C, in a plan view of bottom surface 11. The angle between virtual line L1 and perpendicular line V1 is +10°, and the angle between virtual line L2 and perpendicular line V1 is −10°.

The plurality of holes 15 are arranged on both sides of perpendicular line V1, specifically, on the side surface 13*c* side of perpendicular line V1 (i.e. the negative side of the Y-axis) and on the side surface 13*d* side of perpendicular line V1 (i.e. the positive side of the Y-axis), in a plan view of bottom surface 11. The plurality of holes 15 are arranged in a symmetrical positional relationship with respect to perpendicular line V1 in a plan view of bottom surface 11.

As illustrated in FIG. 8, shortest distance D2 between the bottom of hole 15 and coil portion 21 is greater than shortest distance D1 between side surface 13*a* of magnetic core 10 and coil portion 21. That is, all of the plurality of holes 15 are located outside of region A1 within distance D1 from outer surface 21*a* of coil portion 21 as viewed in the direction along winding axis C. Distance D2 is not the distance in a plan view of bottom surface 11 but the distance in the actual three-dimensional space.

The arrangement of the plurality of holes 15 is not limited to the foregoing example. The plurality of holes 15 may be arranged at any positions on edge 14*a* of side surface 13*a*, and are designed according to the magnetic properties, strength, etc. required of inductor 100.

[Manufacturing Method]

Figure 9:
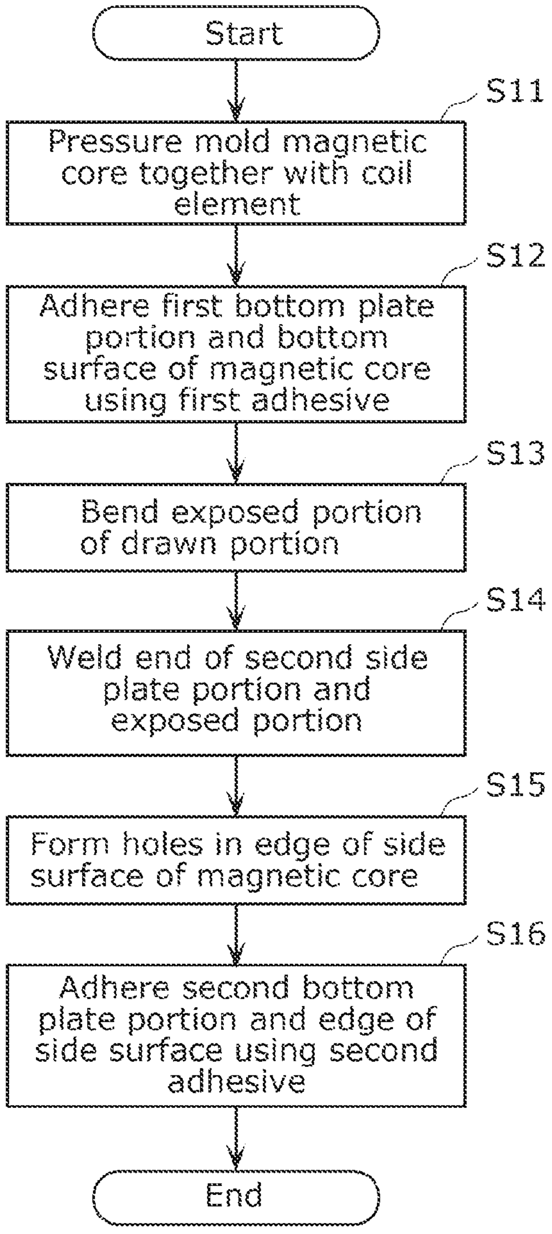
FIG. 9 is a flowchart illustrating a method of manufacturing the inductor according to the embodiment.

A method of manufacturing inductor 100 described above will be described below. FIG. 9 is a flowchart illustrating a method of manufacturing inductor 100 according to the embodiment. The manufacturing method described below is an example, and the manufacturing method for inductor 100 is not limited to such. The following description mainly focuses on half of inductor 100 on the positive side of the X-axis. The same method can be used for half of inductor 100 on the negative side of the X-axis, and the same description applies.

In the method of manufacturing inductor 100, first, a process of pressure molding magnetic core 10 together with coil element 20 is performed (Step S11). The process in Step S11 is performed by pressure molding a dust core so as to contain coil element 20 with coil portion 21 being wound and buried portion 22*a* of drawn portion 22 being bent by working the conductive wire in advance. For example, the pressure applied during pressure molding is 5 ton/cm 2, and the thermal curing temperature is 185° C. After the pressure molding, exposed portion 22*b* of drawn portion 22 exposed without being covered with magnetic core 10 protrudes perpendicularly to side surface 13*c* of magnetic core 10, for example.

Next, a process of adhering first bottom plate portion 32 of electrode member 30 in which bottom plate portion 31 and connection plate portion 34 are formed by cutting and bending a metal material plate in advance to bottom surface 11 of magnetic core 10 using first adhesive 50 is performed (Step S12). In Step S12, first adhesive 50 before curing is applied to at least one of the surface of first bottom plate portion 32 to be adhered to bottom surface 11 and bottom surface 11, and first bottom plate portion 32 and bottom surface 11 are bonded together to thus adhere first bottom plate portion 32 and bottom surface 11 to each other. Here, first bottom plate portion 32 and bottom surface 11 are adhered to each other in a state in which electrode member 30 and magnetic core 10 are in the positional relationship illustrated in FIG. 1. In Step S12, first adhesive 50 is cured by heating or the like according to need.

Next, a process of bending exposed portion 22*b* of drawn portion 22 exposed from magnetic core 10 so as to extend along side surface 13*c* is performed (Step S13). The insulating coating of the conductive wire in exposed portion 22*b* is removed by laser irradiation or the like before Step S13, for example.

Next, a process of welding the end of second side plate portion 36 of connection plate portion 34 and exposed portion 22*b* by laser seam welding or the like is performed (Step S14). Thus, connection portion 40 composed of the plurality of welds 41 is formed.

Next, a process of forming the plurality of holes 15 in edge 14*a* of side surface 13*a* of magnetic core 10 is performed (Step S15). The plurality of holes 15 are formed on side surfaces 13*a* and 13*b* of magnetic core 10 by, for example, laser processing or drilling. Step S15 may be performed at any timing after Step S11 and before next Step S16.

Next, a process of adhering edge 14*a* of side surface 13*a* and second bottom plate portion 33 using second adhesive 60 is performed (Step S16). In Step S16, second adhesive 60 before curing is applied to the corner between edge 14*a* of side surface 13*a* and second bottom plate portion 33 so that second adhesive 60 will enter holes 15 formed in Step S15. In Step S16, second adhesive 60 is cured by heating or the like according to need. The curing treatment in Step S12 and the curing treatment in Step S16 may be performed simultaneously.

Through the foregoing Steps S11 to S16, inductor 100 in which magnetic core 10 and electrode member 30 are adhered with first adhesive 50 and second adhesive 60 is manufactured.

[Effects, Etc.]

As described above, inductor 100 according to this embodiment includes: magnetic core 10 containing a magnetic material and including bottom surface 11, top surface 12, and side surfaces 13*a*, 13*b*, 13*c*, and 13*d* connected to bottom surface 11 and top surface 12; coil element 20 including coil portion 21 buried in magnetic core 10, and formed by a conductive wire; an electrode member containing a conductive material, located outside of magnetic core 10, and electrically connected to coil element 20; first adhesive 50 containing an adhesive resin material and adhering magnetic core 10 and electrode member 30 to each other; and second adhesive 60 containing an adhesive resin material and adhering magnetic core 10 and electrode member 30 to each other at a position different from first adhesive 50. Electrode member 30 includes: first bottom plate portion 32 located on the bottom surface 11 side of magnetic core 10 to extend along bottom surface 11, and overlapping bottom surface 11 in a plan view of bottom surface 11; and second bottom plate portion 33 connected to first bottom plate portion 32, and projecting from side surface 13*a* in a plan view of bottom surface 11. First adhesive 50 is located between first bottom plate portion 32 and bottom surface 11. Second adhesive 60 is located at a corner between edge 14*a* of side surface 13*a* on the bottom surface 11 side and second bottom plate portion 33.

With this structure, magnetic core 10 and electrode member 30 are adhered and fixed to each other not only with first adhesive 50 but also with second adhesive 60. First adhesive 50 adheres bottom surface 11 of magnetic core 10 and electrode member 30 (specifically, first bottom plate portion 32) to each other, while second adhesive 60 adheres side surface 13*a* of magnetic core 10, which is a surface different from bottom surface 11, and electrode member 30 (specifically, second bottom plate portion 33) to each other. This keeps electrode member 30 and magnetic core 10 from separating from each other due to vibration and the like from various directions, so that the vibration resistance of inductor 100 can be improved.

In the case where the size of inductor 100 is increased, the heat capacity of magnetic core 10 is high. Accordingly, when soldering bottom plate portion 31 of electrode member 30 to a circuit board or the like by reflow soldering or the like, the solder does not melt easily. However, in inductor 100, since second bottom plate portion 33 projects from side surface 13*a* of magnetic core 10, the heat from the reflow furnace or the like can be easily absorbed by projecting second bottom plate portion 33 without being transferred to magnetic core 10. That is, the temperature of bottom plate portion 31 rises easily during heating in the reflow furnace or the like. As a result, the solder used for soldering bottom plate portion 31 melts easily, and the wettability of the solder is improved. The reliability of connection between inductor 100 and the circuit board can thus be improved.

In this way, highly reliable inductor 100 can be implemented.

Moreover, for example, magnetic core 10 has the plurality of holes 15 that are open on edge 14*a*, and second adhesive 60 enters the plurality of holes 15.

As a result of second adhesive 60 entering holes 15 formed in edge 14*a* of side surface 13*a*, the anchor effect is exerted and the adhesion strength between side surface 13*a* of magnetic core 10 and second adhesive 60 increases. This keeps electrode member 30 and magnetic core 10 from separating from each other due to vibration and the like, so that the vibration resistance of inductor 100 can be improved.

Moreover, for example, coil portion 21 is buried in magnetic core 10 in a state in which winding axis C of coil portion 21 is in the direction (Z-axis direction) connecting bottom surface 11 and top surface 12, and the plurality of holes 15 are located outside a region bounded by two virtual lines L1 and L2 that form angles of +10° and −10° with respect to a perpendicular line to side surface 13*a* passing through winding axis C of coil portion 21 and that pass through winding axis C, in a plan view of bottom surface 11.

With this structure, in the case where holes 15 are formed in magnetic core 10, holes 15 are located at at least a certain distance away from winding axis C of coil portion 21. Such holes 15 are unlikely to block the flow of the magnetic flux through magnetic core 10 generated by coil portion 21. Therefore, a decrease in the magnetic properties of inductor 100 can be suppressed while the vibration resistance of inductor 100 is enhanced by holes 15.

Moreover, for example, shortest distance D2 between the bottoms of the plurality of holes 15 and coil portion 21 is greater than shortest distance D1 between side surface 13*a* of magnetic core 10 and coil portion 21.

With this structure, in the case where holes 15 are formed in magnetic core 10, holes 15 are located at a distance greater than the shortest distance from outer surface 21*a* of coil portion 21 to side surface 13*a*. Such holes 15 are unlikely to block the flow of the magnetic flux through magnetic core 10 generated by coil portion 21. Therefore, a decrease in the magnetic properties of inductor 100 can be suppressed while the vibration resistance of inductor 100 is enhanced by holes 15.

Moreover, for example, coil element 20 includes drawn portion 22 connected to an end of coil portion 21 and extending from coil portion 21 to the outside of magnetic core 10, electrode member 30 includes connection plate portion 34 connected to first end 32*a* of first bottom plate portion 32 and electrically connected to drawn portion 22, and width W2 of second end 32*b* of first bottom plate portion 32 opposite to first end 32*a* is less than width W1 of first end 32*a*.

As a result of width W2 of second end 32*b* of first bottom plate portion 32 being reduced in this way, the heat capacity of first bottom plate portion 32 during soldering can be reduced, and heat transfer from first bottom plate portion 32 to magnetic core 10 having high heat capacity can be suppressed. Therefore, the temperature of bottom plate portion 31 rises easily during heating in the reflow furnace or the like, and the wettability of the solder used for soldering bottom plate portion 31 can be improved. Since second end 32*b* of first bottom plate portion 32 is far from connection plate portion 34, less current flows between coil element 20 and the circuit board on the second end 32*b* side. Hence, even when width W2 of second end 32*b* is narrow and the resistance around second end 32*b* increases, the current flowing to coil element 20 is affected little. The reliability of connection between inductor 100 and the circuit board can thus be improved while suppressing a decrease in the properties of inductor 100.

Variations of Embodiment

An inductor according to each variation of the embodiment will be described below. The following description of each variation mainly focuses on the differences from the embodiment, and the description of common parts is omitted or simplified.

[Variation 1]

Figure 10:
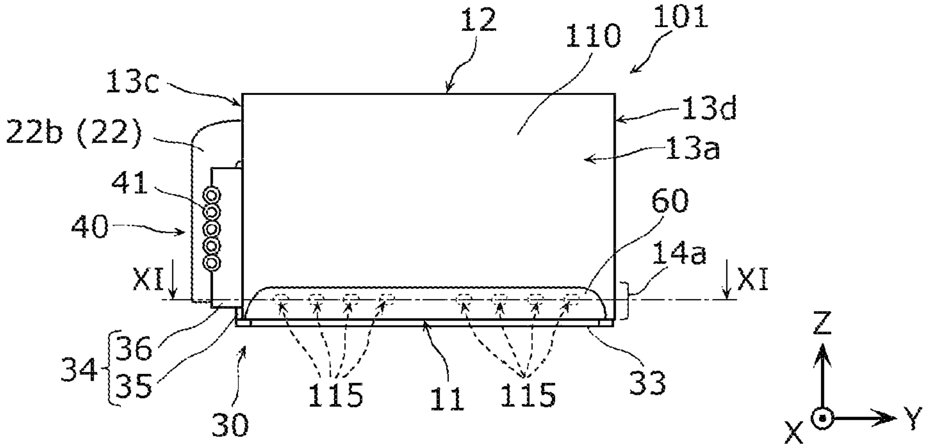
FIG. 10 is a side view of an inductor according to Variation 1 of the embodiment.
Figure 11:
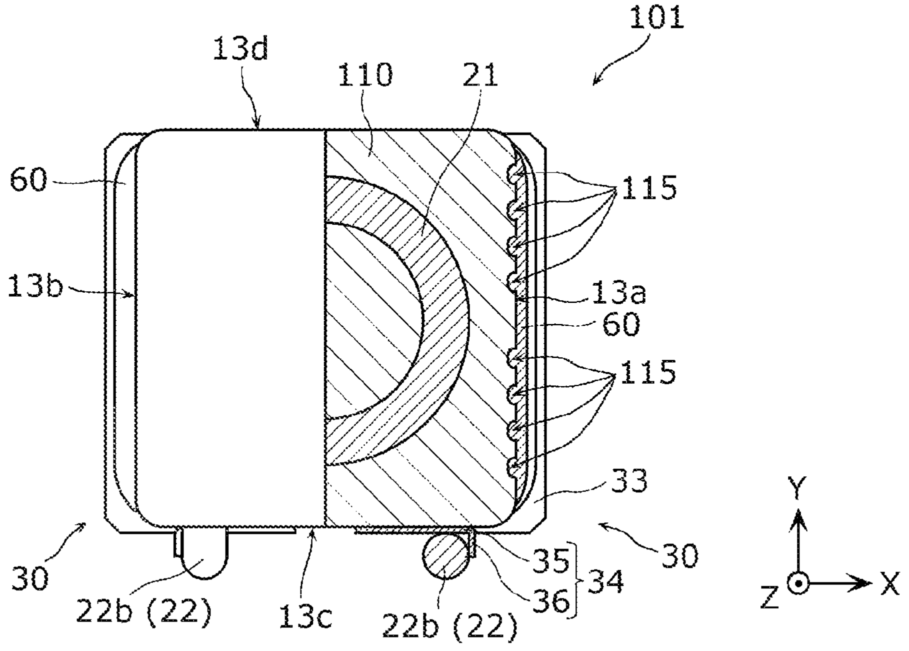
FIG. 11 is a top view of the inductor according to Variation 1 of the embodiment.

First, Variation 1 of the embodiment will be described below. FIG. 10 is a side view of inductor 101 according to Variation 1 of the embodiment. FIG. 11 is a top view of inductor 101 according to Variation 1 of the embodiment. In FIG. 10, the shape seen through second adhesive 60 is indicated by dashed lines. FIG. 11 also includes a sectional view of inductor 100 taken along line XI-XI in FIG. 10.

As illustrated in FIGS. 10 and 11, inductor 101 according to this variation differs from inductor 100 according to the embodiment in that it includes magnetic core 110 having a plurality of holes 115 instead of magnetic core 10 having the plurality of holes 15. In detail, inductor 101 includes magnetic core 110, coil element 20, electrode member 30, connection portion 40, first adhesive 50, and second adhesive 60.

Magnetic core 110 has the same structure as magnetic core 10 except that it has the plurality of holes 115 instead of the plurality of holes 15.

The plurality of holes 115 are open on edge 14*a* of side surface 13*a* on the bottom surface 11 side. The plurality of holes 115 are each an elongated hole having an opening shape that extends in a direction (Y-axis direction) along bottom surface 11 when viewed facing side surface 13*a*.

Not all of the plurality of holes 115 need to be elongated holes, and the plurality of holes 115 may include holes having the same shape as holes 15, for example. The plurality of holes 115 may each be an elongated hole having an opening shape extending in a direction other than the Y-axis direction, for example, the direction (Z-axis direction) connecting bottom surface 11 and top surface 12.

As described above, in inductor 101, at least one hole 115 out of the plurality of holes 115 is an elongated hole having an opening shape extending in the direction along bottom surface 11.

As a result of hole 115 being an elongated hole, the anchor effect by second adhesive 60 entering hole 115 is higher than in the case where the opening shape of the hole is circular or the like, and the adhesion strength between side surface 13*a* of magnetic core 110 and second adhesive 60 increases. This keeps electrode member 30 and magnetic core 110 from separating from each other due to vibration and the like, so that the vibration resistance of inductor 101 can be improved.

[Variation 2]

Figure 12:
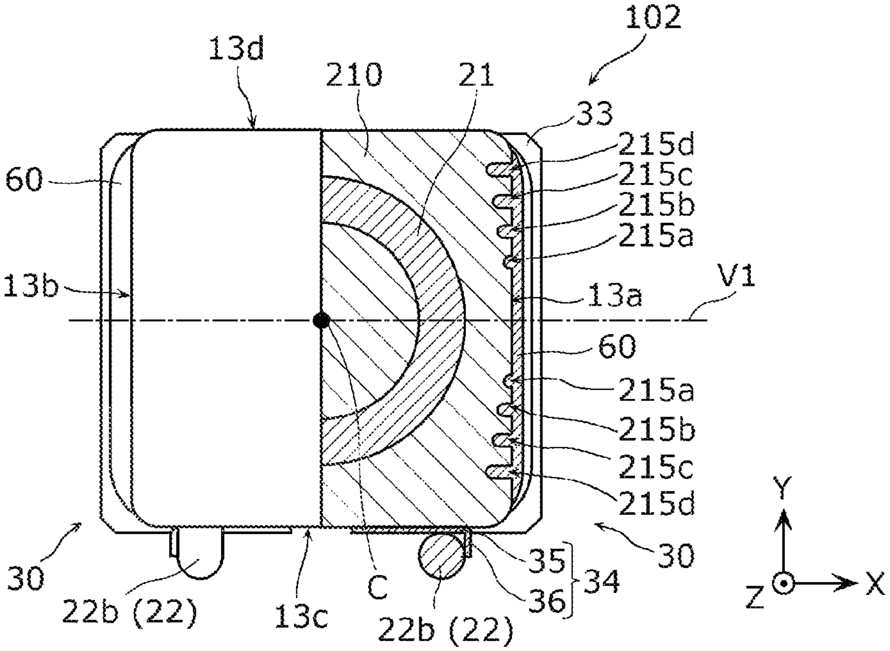
FIG. 12 is a top view of an inductor according to Variation 2 of the embodiment.

Next, Variation 2 of the embodiment will be described below. FIG. 12 is a top view of inductor 102 according to Variation 2 of the embodiment. The appearance of inductor 102 illustrated in FIG. 12 is the same as the appearance of inductor 100 illustrated in FIGS. 1 and 5. FIG. 12 also includes a sectional view of inductor 102 at the same position as inductor 100 illustrated in FIG. 5.

As illustrated in FIG. 12, inductor 102 according to this variation differs from inductor 100 according to the embodiment in that it includes magnetic core 210 having a plurality of holes 215*a*, 215*b*, 215*c*, and 215*d* instead of magnetic core 10 having the plurality of holes 15. In detail, inductor 102 includes magnetic core 210, coil element 20, electrode member 30, connection portion 40, first adhesive 50, and second adhesive 60.

Magnetic core 210 has the same structure as magnetic core 10 except that it has the plurality of holes 215*a*, 215*b*, 215*c*, and 215*d* instead of the plurality of holes 15.

The depth of hole 215*b* is greater than the width of the opening of hole 215*b* in the direction (Y-axis direction) along bottom surface 11 when viewed facing side surface 13*a*. The same applies to holes 215*c* and 215*d*.

The depth of each of the plurality of holes 215*a*, 215*b*, 215*c*, and 215*d* is greater when the hole is farther from perpendicular line V1 to side surface 13*a* passing through winding axis C in a plan view of bottom surface 11. That is, the hole depth increases in the order of holes 215*a*, 215*b*, 215*c*, and 215*d* arranged along bottom surface 11 in the direction away from perpendicular line V1.

As described above, in inductor 102, the depth of each of holes 215*b*, 215*c*, and 215*d* out of the plurality of holes 215*a*, 215*b*, 215*c*, and 215*d* is greater than the width of the opening of hole in the direction along bottom surface 11.

As a result of holes 215*b*, 215*c*, and 215*d* being greater in depth than in width, the anchor effect by second adhesive 60 entering holes 215*b*, 215*c*, and 215*d* is higher than in the case where the holes are not greater in depth than in width, and the adhesion strength between side surface 13*a* of magnetic core 210 and second adhesive increases. This keeps electrode member 30 and magnetic core 210 from separating from each other due to vibration and the like, so that the vibration resistance of inductor 102 can be improved.

For example, in inductor 102, the depth of each of the plurality of holes 215*a*, 215*b*, 215*c*, and 215*d* is greater when the hole is farther from perpendicular line V1 to side surface 13*a* passing through winding axis C of coil portion 21 in a plan view of bottom surface 11.

With this structure, of the plurality of holes 215*a*, 215*b*, 215*c*, and 215*d*, a hole farther from perpendicular line V1 is deeper, and the anchor effect is enhanced as a result of second adhesive 60 entering the hole. Of the plurality of holes 215*a*, 215*b*, 215*c*, and 215*d*, a hole closer to winding axis C of coil portion 21 where the magnetic flux is more likely to be affected is shallower. Such a plurality of holes 215*a*, 215*b*, 215*c*, and 215*d* are unlikely to block the flow of the magnetic flux through magnetic core 210 generated by coil portion 21. Therefore, a decrease in the magnetic properties of inductor 102 can be suppressed while the vibration resistance of inductor 102 is enhanced by the plurality of holes 215*a*, 215*b*, 215*c*, and 215*d*.

[Variation 3]

Figure 13:
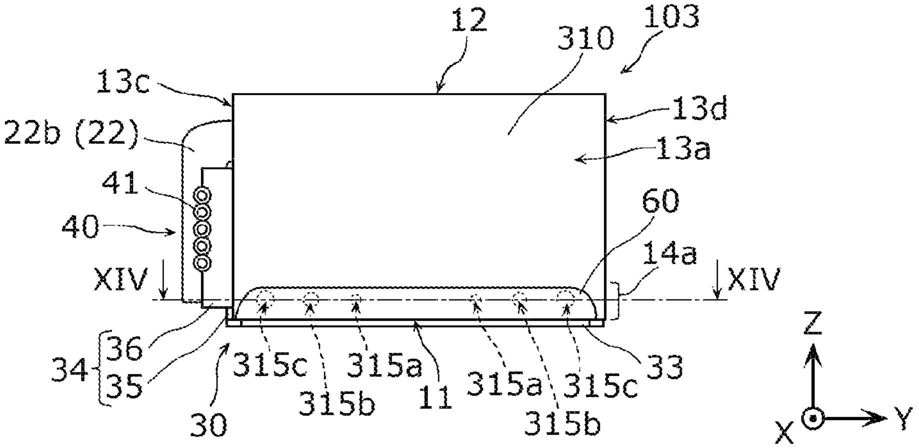
FIG. 13 is a side view of an inductor according to Variation 3 of the embodiment.
Figure 14:
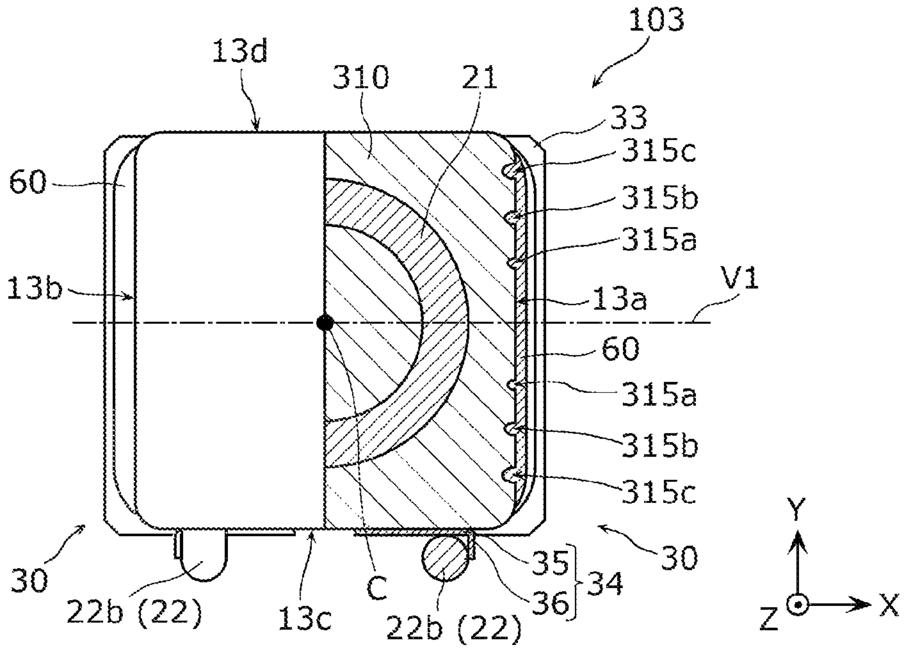
FIG. 14 is a top view of the inductor according to Variation 3 of the embodiment.

Next, Variation 3 of the embodiment will be described below. FIG. 13 is a side view of inductor 103 according to Variation 3 of the embodiment. FIG. 14 is a top view of inductor 103 according to Variation 3 of the embodiment. In FIG. 13, the shape seen through second adhesive 60 is indicated by dashed lines. FIG. 14 also includes a sectional view of inductor 103 taken along line XIV-XIV in FIG. 13.

As illustrated in FIGS. 13 and 14, inductor 103 according to this variation differs from inductor 100 according to the embodiment in that it includes magnetic core 310 having a plurality of holes 315*a*, 315*b*, and 315*c* instead of magnetic core 10 having the plurality of holes 15. In detail, inductor 103 includes magnetic core 310, coil element 20, electrode member 30, connection portion 40, first adhesive 50, and second adhesive 60.

Magnetic core 310 has the same structure as magnetic core 10 except that it has the plurality of holes 315*a*, 315*b*, and 315*c* instead of the plurality of holes 15.

The width of the opening of each of the plurality of holes 315*a*, 315*b*, and 315*c* in the direction (Y-axis direction) along bottom surface 11 when viewed facing side surface 13*a* is greater when the hole is farther from perpendicular line V1 to side surface 13*a* passing through winding axis C. That is, the hole opening width increases in the order of holes 315*a*, 315*b*, and 315*c* arranged along bottom surface 11 in the direction away from perpendicular line V1.

Moreover, the depth of each of the plurality of holes 315*a*, 315*b*, and 315*c* is greater when the hole is farther from perpendicular line V1 to side surface 13*a* passing through winding axis C in a plan view of bottom surface 11, as in inductor 102.

As described above, in inductor 103, the width of the opening of each of the plurality of holes 315*a*, 315*b*, and 315*c* in the direction along bottom surface 11 is greater when the hole is farther from perpendicular line V1 to side surface 13*a* passing through winding axis C of coil portion 21 in a plan view of bottom surface 11.

With this structure, of the plurality of holes 315*a*, 315*b*, and 315*c*, a hole farther from perpendicular line V1 contributes to a greater anchor effect as a result of second adhesive 60 entering the hole. Of the plurality of holes 315*a*, 315*b*, and 315*c*, a hole closer to winding axis C of coil portion 21 where the magnetic flux is more likely to be affected has a smaller opening width in the direction along bottom surface 11. Such a plurality of holes 315*a*, 315*b*, and 315*c* are unlikely to block the flow of the magnetic flux through magnetic core 310 generated by coil portion 21. Therefore, a decrease in the magnetic properties of inductor 103 can be suppressed while the vibration resistance of inductor 103 is enhanced by the plurality of holes 315*a*, 315*b*, and 315*c*.

[Variation 4]

Figure 15:
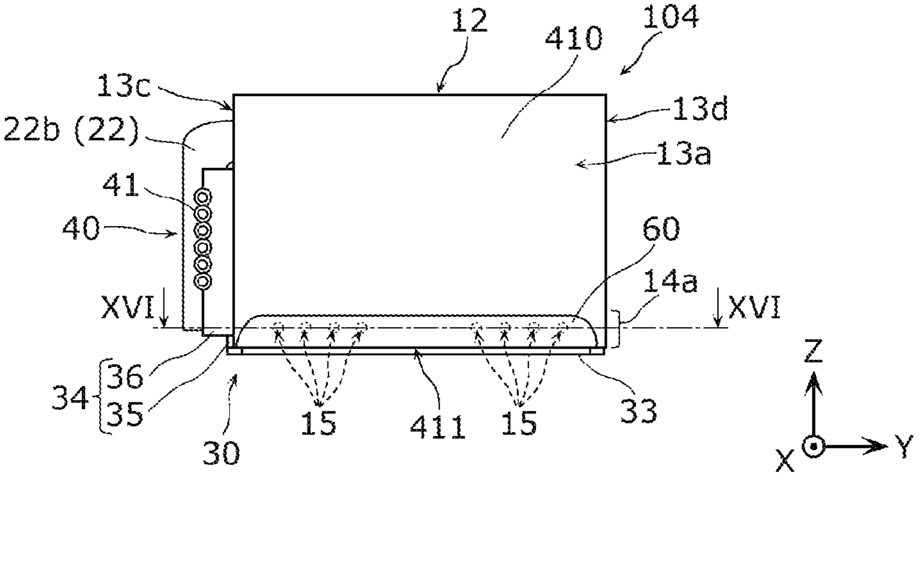
FIG. 15 is a side view of an inductor according to Variation 4 of the embodiment.
Figure 16:
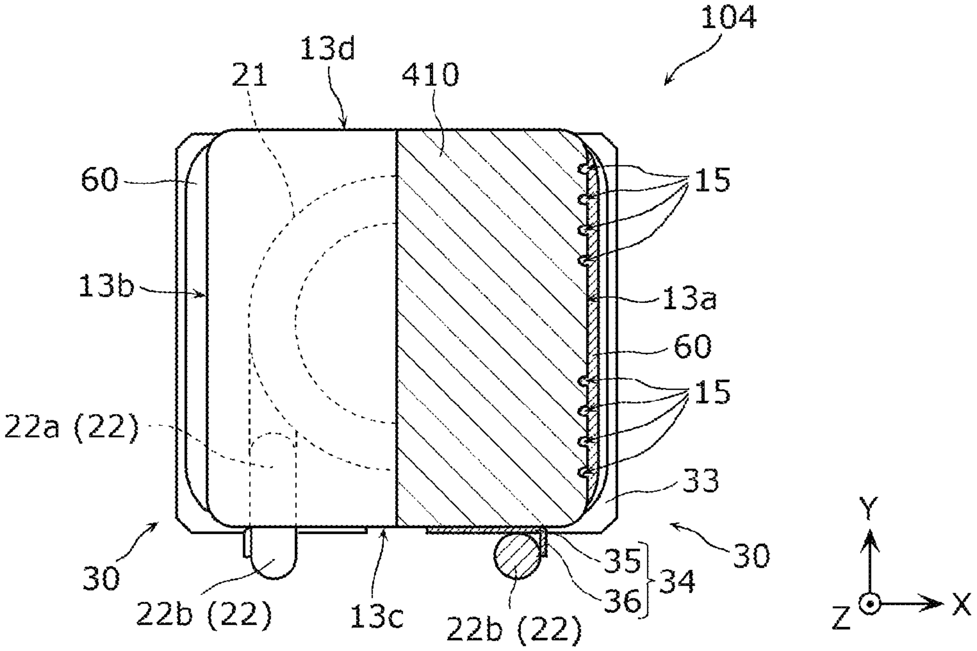
FIG. 16 is a top view of the inductor according to Variation 4 of the embodiment.

Next, Variation 4 of the embodiment will be described below. FIG. 15 is a side view of inductor 104 according to Variation 4 of the embodiment. FIG. 16 is a top view of inductor 104 according to Variation 4 of the embodiment. In FIG. 15, the shape seen through second adhesive 60 is indicated by dashed lines. FIG. 16 also includes a sectional view of inductor 104 taken along line XVI-XVI in FIG. 15. In FIG. 16, the top view shape of coil element 20 seen through magnetic core 410 is indicated by dashed lines.

As illustrated in FIGS. 15 and 16, inductor 104 according to this variation differs from inductor 100 according to the embodiment in that it includes, instead of magnetic core 10, magnetic core 410 larger in dimension in the Z-axis direction than magnetic core 10. In detail, inductor 104 includes magnetic core 410, coil element 20, electrode member 30, connection portion 40, first adhesive 50, and second adhesive 60. Since magnetic core 410 is larger in dimension in the Z-axis direction than magnetic core 10, the distance between bottom surface 411 of magnetic core 410 and coil portion 21 is longer, and the part of magnetic core 410 located between coil portion 21 and first bottom plate portion 32 is thicker. This improves the mechanical strength of inductor 104.

As illustrated in FIG. 16, in inductor 104, coil portion 21 and the plurality of holes 15 are not located on the same plane along bottom surface 411. The height from bottom surface 411 to each of the plurality of holes 15 (i.e. the shortest distance between bottom surface 411 and each of the plurality of holes 15) is less than the height from bottom surface 411 to coil portion 21 (i.e. the shortest distance between bottom surface 411 and coil portion 21).

Magnetic core 410 may have the plurality of holes according to any one of Variations 1 to 3 of the embodiment, instead of the plurality of holes 15.

As described above, in inductor 104, the height from bottom surface 411 to each of the plurality of holes 15 is less than the height from bottom surface 411 to coil portion 21.

In the case where the plurality of holes 15 are formed in magnetic core 410, coil portion 21 is closer to top surface 12 than the plane along bottom surface 411 where the plurality of holes 15 are located. Such holes 15 are unlikely to block the flow of the magnetic flux through magnetic core 410 generated by coil portion 21. Therefore, a decrease in the magnetic properties of inductor 104 can be suppressed while the vibration resistance of inductor 104 is enhanced by holes 15.

[Variation 5]

Figure 17:
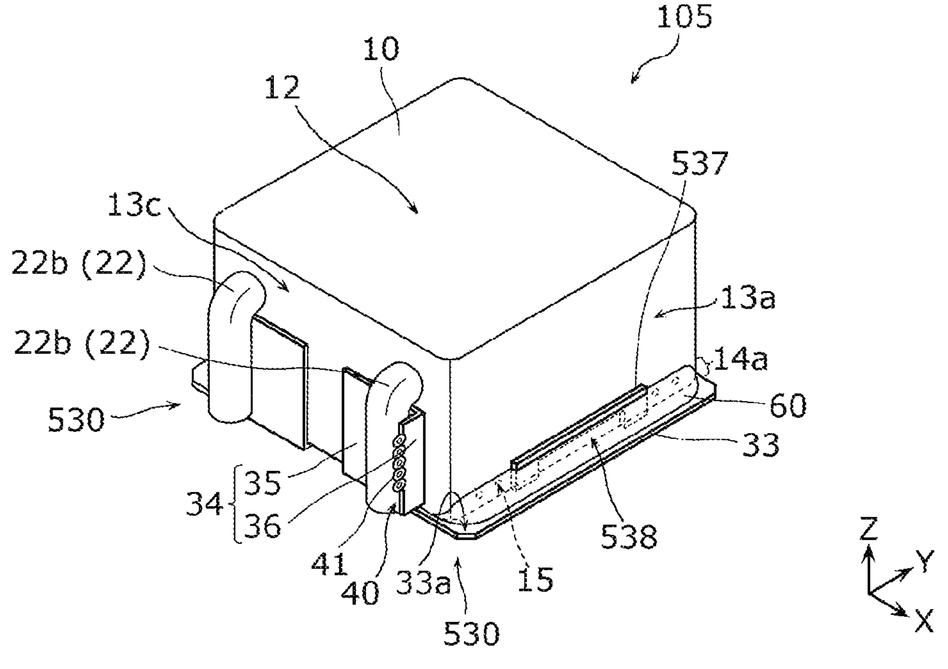
FIG. 17 is a perspective view of an inductor according to Variation 5 of the embodiment.
Figure 18:
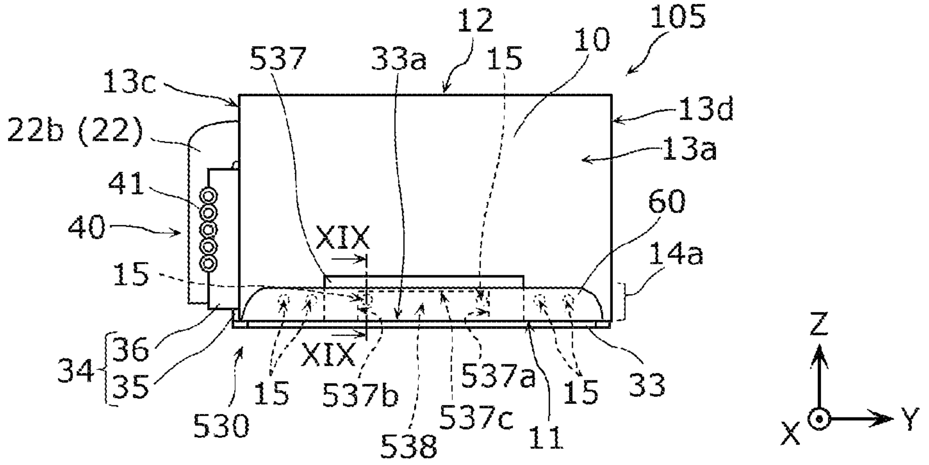
FIG. 18 is a side view of the inductor according to Variation 5 of the embodiment.
Figure 19:
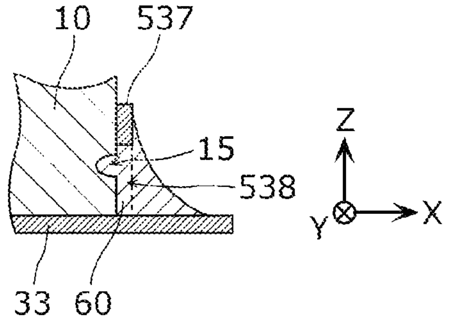
FIG. 19 is a sectional view of the inductor according to Variation of the embodiment.

Next, Variation 5 of the embodiment will be described below. FIG. 17 is a perspective view of inductor 105 according to Variation 5 of the embodiment. FIG. 18 is a side view of inductor 105 according to Variation 5 of the embodiment. FIG. 19 is a sectional view of inductor 105 taken along line XIX-XIX in FIG. 18. In FIGS. 17 and 18, the shape seen through second adhesive 60 is indicated by dashed lines. FIG. 19 is an enlarged sectional view of the vicinity of raised piece 537.

As illustrated in FIGS. 17 to 19, inductor 105 according to this variation differs from inductor 100 according to the embodiment in that it includes electrode member 530 instead of electrode member 30. In detail, inductor 105 includes magnetic core 10, coil element 20, electrode member 530, connection portion 40, first adhesive 50, and second adhesive 60.

Electrode member 530 includes raised piece 537 in addition to the structure of electrode member 30.

Raised piece 537 is located on the magnetic core 10 side of second bottom plate portion 33. Raised piece 537 is connected to second bottom plate portion 33, and extends in the direction (Z-axis direction) from bottom surface 11 toward top surface 12 along side surface 13*a*. Raised piece 537 is formed, for example, by cutting part of bottom plate portion 31 and bending and raising it. Raised piece 537 may be formed by separately producing a member having the shape of raised piece 537 and connecting the member to second bottom plate portion 33.

Raised piece 537 has opening 538 as a through hole in the direction (X-axis direction) toward side surface 13*a*. Opening 538 is formed in a region where at least one hole 15 out of the plurality of holes 15 is located when viewed facing side surface 13*a*. Opening 538 is formed by inner surfaces 537*a*, 537*b*, and 537*c* of raised piece 537 and surface 33*a* of second bottom plate portion 33. Hence, opening 538 is located directly above second bottom plate portion 33.

The opening shape of opening 538 is, for example, rectangular, but may be any other shape such as semicircular. Opening 538 may be surrounded only by the inner surfaces of raised piece 537.

In inductor 105, second adhesive 60 enters the plurality of holes 15 and also enters opening 538, and is in contact with and adhere to inner surfaces 537*a*, 537*b*, and 537*c* of raised piece 537 forming opening 538.

Inductor 105 may include the magnetic core according to any one of Variations 1 to 4 of the embodiment, instead of magnetic core 10.

As described above, in inductor 105, electrode member 530 includes raised piece 537 connected to second bottom plate portion 33 and extending in the direction from bottom surface 11 toward top surface 12 along side surface 13*a*. Raised piece 537 has opening 538 in a region where at least one hole 15 out of the plurality of holes 15 is located when viewed facing side surface 13*a*. Second adhesive 60 enters opening 538, and is in contact with inner surfaces 537*a*, 537*b*, and 537*c* of raised piece 537 forming opening 538.

As a result of second adhesive 60 entering opening 538 of raised piece 537 connected to second bottom plate portion 33, second adhesive 60 is in contact with not only surface 33*a* of second bottom plate portion 33 but also inner surfaces 537*a*, 537*b*, and 537*c* of raised piece 537. Therefore, even when surface 33*a* separates from second adhesive 60, the adhesion between second adhesive 60 and inner surfaces 537*a*, 537*b*, and 537*c* prevents magnetic core 10 and electrode member 530 from separating from each other.

Moreover, since opening 538 corresponds in position to the region where at least one hole 15 is located, second adhesive 60 entering opening 538 also enters hole 15. Accordingly, when magnetic core 10 tries to separate from electrode member 530 in the Z-axis direction or the Y-axis direction, second adhesive 60 is caught in both hole 15 and opening 538, so that the separation between magnetic core 10 and electrode member 530 can be further prevented.

Other Embodiments, Etc.

While the inductors, etc. according to the embodiment and variations of the present disclosure have been described above, the present disclosure is not limited to such embodiment and variations. Other modifications obtained by applying various changes conceivable by a person skilled in the art to the embodiment and variations and any combinations of the elements in different embodiment and variations without departing from the scope of the present disclosure are also included in the scope of the present disclosure.

For example, although the foregoing embodiment and variations describe the case where the magnetic core has a plurality of holes, the present disclosure is not limited to such. The number of holes in the magnetic core may be one. That is, the magnetic core may have one or more holes. The magnetic core may have no hole, and the second adhesive may adhere the edge of the side surface of the magnetic core having no hole and the second bottom plate portion to each other.

For example, an electric product or an electric circuit using the inductor described above is also included in the present disclosure. Examples of the electric product include power supply devices including the above-described inductor and various devices including the power supply devices.

INDUSTRIAL APPLICABILITY

The inductor according to the present disclosure is useful as an inductor used in various devices and equipment.

The invention claimed is:

1. An inductor comprising:

a magnetic core containing a magnetic material and including a bottom surface, a top surface, and a side surface connected to the bottom surface and the top surface;

a coil element including a coil portion buried in the magnetic core, and formed by a conductive wire;

an electrode member containing a conductive material, located outside of the magnetic core, and electrically connected to the coil element;

a first adhesive containing an adhesive resin material and adhering the magnetic core and the electrode member to each other; and a second adhesive containing an adhesive resin material and adhering the magnetic core and the electrode member to each other at a position different from the first adhesive, wherein the electrode member includes a bottom plate located on a same side as the bottom surface of the magnetic core to extend along the bottom surface, the bottom plate includes:

a first portion which is a portion overlapping the bottom surface in a plan view of the bottom surface; and a second portion which is a portion connected to the first portion, and projecting from the side surface in the plan view of the bottom surface, the first adhesive is located between the first portion and the bottom surface, and the second adhesive is located at a corner between an edge of the side surface closer to the bottom surface and the second portion.

2. The inductor according to claim 1, wherein the magnetic core has one or more holes that are open on the edge, and the second adhesive enters the one or more holes.

3. The inductor according to claim 2, wherein at least one hole out of the one or more holes is an elongated hole having an opening shape that extends in a direction along the bottom surface.

4. The inductor according to claim 2, wherein a depth of at least one hole out of the one or more holes is greater than a width of an opening of the at least one hole in a direction along the bottom surface.

5. The inductor according to claim 2, wherein the coil portion is buried in the magnetic core in a state in which a winding axis of the coil portion is in a direction connecting the bottom surface and the top surface, and the one or more holes are located outside a region bounded by two virtual lines that form angles of +10° and −10° with respect to a perpendicular line to the side surface passing through the winding axis of the coil portion and that pass through the winding axis, in the plan view of the bottom surface.

6. The inductor according to claim 2, wherein a shortest distance between a bottom of the one or more holes and the coil portion is greater than a shortest distance between the side surface of the magnetic core and the coil portion.

7. The inductor according to claim 2, wherein the electrode member includes a raised piece connected to the second portion and extending along the side surface in a direction from the bottom surface toward the top surface, the raised piece has an opening in a region where at least one hole out of the one or more holes is located when viewed facing the side surface, and the second adhesive enters the opening and is in contact with an inner surface of the raised piece forming the opening.

8. The inductor according to claim 2, wherein a height from the bottom surface to each of the one or more holes is less than a height from the bottom surface to the coil portion.

9. The inductor according to claim 2, wherein the one or more holes comprise a plurality of holes, and a width of an opening of each of the plurality of holes in a direction along the bottom surface is greater when the hole is farther from a perpendicular line to the side surface passing through a winding axis of the coil portion in the plan view of the bottom surface.

10. The inductor according to claim 2, wherein the one or more holes comprise a plurality of holes, and a depth of each of the plurality of holes is greater when the hole is farther from a perpendicular line to the side surface passing through a winding axis of the coil portion in the plan view of the bottom surface.

11. The inductor according to claim 1, wherein the coil element includes a drawn portion connected to an end of the coil portion and extending from the coil portion to the outside of the magnetic core, the electrode member includes a connection plate portion connected to a first end of the first portion and electrically connected to the drawn portion, and a width of a second end of the first portion opposite to the first end is less than a width of the first end.

* * * * *